Aug. 31, 1943.  H. PFAU  2,328,489
DEVICE FOR CONTROLLING THE PRESSURE AND TEMPERATURE IN
ALTITUDE CABINS, PARTICULARLY FOR AIRPLANES
Filed May 21, 1940
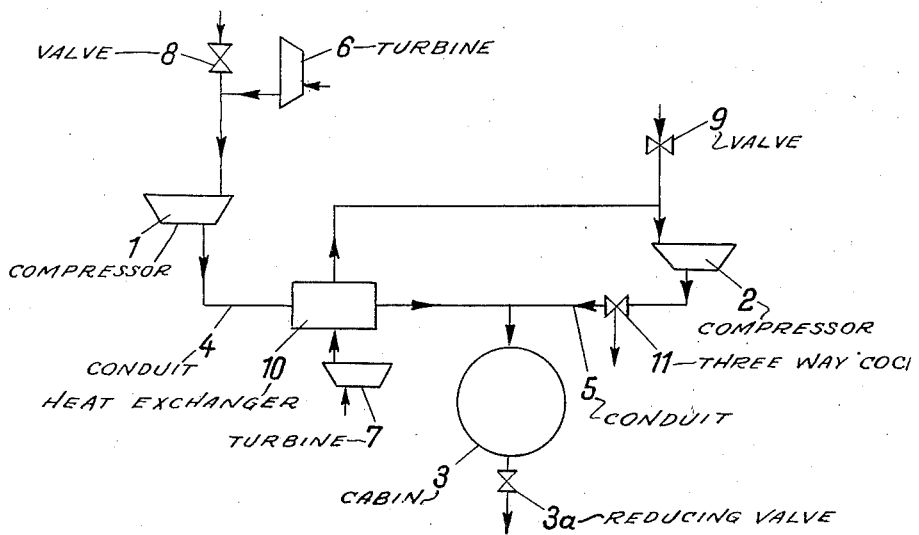
Inventor:
HANS PFAU
by his attorneys Patented Aug. 31, 1943

2,328,489

UNITED STATES PATENT OFFICE 2,328,489

DEVICES FOR CONTROLLING THE PRESSURE AND TEMPERATURE IN ALTITUDE CABINS, PARTICULARLY FOR AIRPLANES

Hans Pfau, Berlin-Adlershof, Germany; vested in the Alien Property Custodian

Application May 21, 1940, Serial No. 336,484
In Germany May 25, 1939

5 Claims. (Cl. 128—204)

In order to maintain the pressure of the air in the cabins of airplanes at a magnitude agreeable to the human occupants, the interior of the cabin, as is well known, is charged by special compressors. These latter, as is also well known, are driven either by means of a special power engine by controlling the number of revolutions thereof or by being rigidly connected to the motor of the airplane. If the drive is derived from the motor and not by controlling the number of revolutions without stages, the control of the pressure in the cabin can be effected at the various altitudes by means of known pressure reducing valves. The control of the temperature, as far as a heating of the air in the cabin is necessary yet, may also be effected in known manner. If such heating was fully stopped, a further lowering of the temperature of the air in the cabin was no longer possible. This fact may, especially on hot days or when flying in the tropics, call for a cessation of the ventilation of the cabin in order to avoid overheating. Naturally the pressure in the cabin will then drop to be equivalent to the outside pressure, which may lead to disagreeable sensations just according to the altitude of the aircraft.

Now according to the invention there is a possibility to lower the temperature extensively and under certain conditions below the temperature of the atmospheric air. By means of suitable controlling devices the pressure and the temperature of the air in the cabin may then be held always at the same magnitude.

An arrangement according to the invention is shown diagrammatically in the drawing.

The compressors 1 and 2, which are driven for instance by the motors of an airplane having two motors, will supply the cabin 3 with air under a pressure agreeable to the human occupants, by way of the conduits 4 and 5. The spent air will leave the cabin through a known pressure reducing valve 3a. In order to keep constant the internal pressure in the cabin with a decreasing altitude of flight, there will be required in the air admission conduits special devices lowering the pressure. Now this reduction of pressure according to the invention is not effected by means of simple throttle valves, as was customary up to now, but through the turbines 6 and 7. The reduction of pressure—seen from a thermo-dynamical viewpoint—does not constitute a throttling, but according to the invention an expansion doing some work. As is known per se, through this step there will not only occur a reduction of pressure but a reduction of the temperature besides. The cutting in of the turbines, which are connected by means of a by-pass duct, is effected through a gradual closing of the valves 8 and 9, by which step the air is compelled to pass through the turbines 6 and 7. Valves 8 and 9 in the present embodiment are closed by the action of automatic mechanism (not shown). Thus the lowering of the temperature of the air admitted to the cabin through the turbines 6 and 7 will counteract at a decreasing altitude of flight the increasing temperature of the outside air, whereby thus also the temperature of the air in the cabin may be maintained for instance at a constant value. It will not influence the thermodynamical effect of the turbines 6 and 7 if the latter are located ahead or in the rear of the compressors 1 and 2.

If it is now desired on a hot summer-day or for instance in the tropics to bring down the temperature in the interior of the cabin to a value agreeable to the human occupants, which is in this instance a degree lying below that of the outside temperature, the invention offers also for this purpose a chance. The air discharged from the turbine 7 has, in consequence of its expansion to the lower pressure prevailing in the rear of the turbine, which is maintained by the charging device, likewise a temperature lying substantially below that surrounding the aircraft. The cold air so produced may now be utilized for cooling the air admitted to the cabin and discharged from the compressor 1. This is effected through the heat exchanging device 10. Through the transmission of heat so effected, naturally the temperature of the air discharged from the compressor 2 will increase. Therefore it is conveyed through the three-way cock 11 no longer to the cabin, but into the outside air.

I claim:

1. Device for controlling the pressure and temperature in altitude cabins, particularly in airplanes, comprising in combination, a cabin, compressors, turbines arranged ahead of said compressors, a heat exchanging device, valves, and means for utilizing the air, which leaves the turbine arranged ahead of one compressor, for cooling the compressor air of another compressor in said heat exchanging device, while the air heated through the heat exchanging device is caused to flow into the open air by actuating said valves.

2. Device for controlling aircraft cabin pressures and temperatures, comprising two or more compressors supplying air to the cabin and two or more cooling turbines in the suction line of these compressors, said turbines being driven by the suction air passing to the compressors and thereby cooling said air.

3. Device for controlling aircraft cabin pressures and temperatures comprising two or more compressors supplying air to the cabin, flow controlling means in the suction line of these compressors and two or more cooling turbines being connected with the suction line by means of a by-pass between the compressor and the flow controlling means, said turbines being driven by the suction air passing to the compressors and thereby cooling said air.

4. In a system for controlling the pressure and temperature in an aircraft cabin, a first compressor adapted to supply compressed air to the cabin, a first turbine having its outlet connected to the inlet of said first compressor and having an inlet adapted to draw air from the atmosphere, a second compressor adapted to supply compressed air to the cabin, a second turbine having its outlet connected to the inlet of said second compressor and having an inlet adapted to draw air from the atmosphere, a heat exchange unit adapted to pass the air from said first compressor into heat exchange relationship with respect to the air passing from said second turbine to said second compressor, and a valve assembly operative to connect both of said compressors selectively either to their respective turbines or directly to atmosphere and to connect the discharge of said second compressor selectively either to the cabin or to atmosphere, whereby said turbines may be connected in series with their respective compressors to produce cool air and the air from said second turbine may be used to cool the air passing from said first compressor to the cabin while the air from said second compressor is discharged to atmosphere.

5. In a system for controlling the pressure and temperature in an aircraft cabin as described in claim 4 wherein said valves are automatically controlled.

HANS PFAU.